United States Patent
Zecchi et al.

(10) Patent No.: US 8,671,983 B2
(45) Date of Patent: Mar. 18, 2014

(54) GAS PRESSURE REGULATOR

(75) Inventors: Stefano Zecchi, Bologna (IT); Omero Borghesani, Centro (IT)

(73) Assignee: O.M.T. Officina Meccanica Tartarini S.r.l., Castel Maggiore (Bologna) (IT)

( * ) Notice: Subject to any disclaimer, the term of this patent is extended or adjusted under 35 U.S.C. 154(b) by 364 days.

(21) Appl. No.: 13/010,861

(22) Filed: Jan. 21, 2011

(65) Prior Publication Data

US 2011/0186140 A1 Aug. 4, 2011

(30) Foreign Application Priority Data

Feb. 4, 2010 (IT) .................................. BO10A0063

(51) Int. Cl.
*F16K 47/08* (2006.01)
(52) U.S. Cl.
USPC ......... 137/625.33; 251/118; 251/360; 138/40
(58) Field of Classification Search
USPC ............. 251/118, 127, 360–363; 137/625.33, 137/625.28, 625.3; 138/40
See application file for complete search history.

(56) References Cited

U.S. PATENT DOCUMENTS

| | | | | |
|---|---|---|---|---|
| 3,821,968 A | * | 7/1974 | Barb | 137/625.3 |
| 4,041,982 A | * | 8/1977 | Lindner | 137/625.3 |
| 4,402,485 A | * | 9/1983 | Fagerlund | 251/118 |
| 4,512,548 A | * | 4/1985 | Keller | 251/118 |
| 4,558,844 A | * | 12/1985 | Donahue, Jr. | 251/118 |
| 4,617,963 A | * | 10/1986 | Stares | 137/625.3 |
| 4,766,932 A | * | 8/1988 | Heymann et al. | 137/625.3 |
| 4,834,133 A | * | 5/1989 | LaCoste et al. | 137/625.3 |
| 4,860,993 A | * | 8/1989 | Goode | 137/625.3 |
| 4,938,450 A | * | 7/1990 | Tripp et al. | 137/625.3 |
| 5,018,703 A | * | 5/1991 | Goode | 251/127 |
| 5,236,014 A | * | 8/1993 | Buls et al. | 137/625.3 |
| 5,772,178 A | * | 6/1998 | Bey | 251/127 |
| 5,904,174 A | * | 5/1999 | Carew et al. | 137/329.2 |
| 7,448,409 B2 | * | 11/2008 | Micheel et al. | 137/625.37 |
| 2006/0219966 A1 | * | 10/2006 | Zecchi et al. | 251/61.2 |
| 2007/0272316 A1 | | 11/2007 | Zecchi et al. | |
| 2008/0258097 A1 | | 10/2008 | Griffin et al. | |
| 2010/0319799 A1 | * | 12/2010 | McCarty | 138/42 |

FOREIGN PATENT DOCUMENTS

DE  20312048 U1  12/2003

OTHER PUBLICATIONS

Italian Search Report and Written Opinion from corresponding Italian Application No. BO2010000063, dated Sep. 20, 2010.

* cited by examiner

*Primary Examiner* — Eric Keasel
(74) *Attorney, Agent, or Firm* — Marshall, Gerstein & Borun LLP

(57) ABSTRACT

A gas pressure regulator comprises a central body having a first, gas inlet pipe and a second, gas outlet pipe; a shutter housed at least partially in the central body and mobile to adjust the opening of a section for the passage of the gas between a position (B) in which the section is fully open and a position (A) in which the section is closed; a silencing device located in the central body at the passage section, for reducing the noise created by the passage of the gas; and means for fastening the silencing device to the central body. The silencing device comprises a cylindrical perforated plate to allow the passage of the gas.

17 Claims, 7 Drawing Sheets

GAS PRESSURE REGULATOR

CROSS-REFERENCE TO RELATED APPLICATIONS

This application claims the priority benefits of Italian Patent Application Serial No. BO2010A 000063, filed Feb. 4, 2010, the disclosures of which are hereby incorporated by reference.

BACKGROUND OF THE INVENTION

This invention addresses the technical sector relating to gas regulators.

More specifically, the invention relates to a gas pressure regulator equipped with a silencing device.

One prior art gas regulator comprises a central body in which an internal cavity is formed.

The central body is connected to a first, gas inlet pipe and a second, gas outlet pipe.

The regulator also comprises a shutter which is slidably fitted inside the cavity in the central body.

The shutter is mobile in the direction of its axis to adjust the opening of the gas passage section.

The shutter is mobile between a fully open position, where it allows the maximum flow of gas between the inlet pipe and the outlet pipe, and a closed position, where it engages with a seal which is inserted inside the central body and which is made of a compliant material (for example, rubber), to prevent the gas from flowing between the inlet pipe and the outlet pipe.

The pressure regulator also comprises a silencing device designed to reduce the noise generated in the gas regulator by known physical phenomena such as gas acceleration to a speed faster than sound, the formation of shock waves, etc.

The silencing device comprises a mesh ring consisting of thin wire mesh and a pair of U-shaped edges on one side, which close the mesh.

The wire mesh is securely crimped within the U-shaped section of the respective pair of edges.

The silencing device thus made is mounted inside the central body, supported by a supporting element fixed to the central body.

The mesh ring forms a forced passage for the gas between the inlet pipe and the outlet pipe.

When the speed of the gas is high, however, this type of silencing device tends to break frequently.

The mesh the ring is made from is not strong enough to resist high gas speeds and soon breaks.

Moreover, solid particles (such as dust or other debris) which may be carried by the gas leads to mesh wear and failure of the silencing device.

This type of pressure regulator is not therefore suitable for gas flowing at high speeds or containing solid particles, even small diameter particles (where the expression "small diameter" includes particles even smaller than 5 µm in diameter).

In conditions of high flow speed and/or in the presence of impurities in the gas, the mesh ring silencing device is replaced with a more robust silencing device capable of resisting high gas speeds.

In that case, the silencing device consists of a hollow cylinder made from a section bar or a single block, suitably machined, with a plurality of holes for the passage of the gas made on its outer peripheral surface usually by drilling with a machine tool.

This silencing device, however, is cumbersome, heavy and, above all, very expensive.

Furthermore, the production cycle of a silencing device of this kind is extremely lengthy.

SUMMARY OF THE INVENTION

This invention therefore has for an aim to propose a technical solution that can overcome these drawbacks, that is to say, to propose a gas pressure regulator equipped with a silencing device which can operate effectively and reliably with, and is suitable for, gas flowing at high speeds and gas carrying dirt and/or debris, and which is also inexpensive to make.

Another aim of the invention is to propose a gas pressure regulator equipped with a silencing device which is limited in size and reduced in weight.

According to the invention, this aim is achieved by a gas pressure regulator comprising the technical characteristics described in one or more of the appended claims.

BRIEF DESCRIPTION OF THE DRAWINGS

The technical features of the invention, with reference to the above aims, are clearly described in the claims below and its advantages are more apparent from the detailed description which follows, with reference to the accompanying drawings which illustrate a preferred non-limiting example embodiment of the invention, and in which:

DESCRIPTION OF THE PREFERRED EMBODIMENTS

Figure 1A:
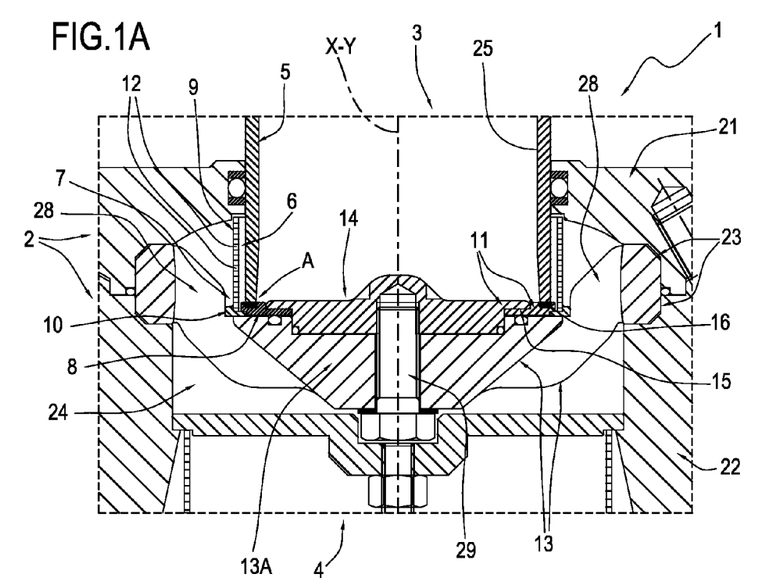
FIGS. 1A and 1B are schematic cross sections illustrating a preferred embodiment of the gas pressure regulator according to the invention in two different configurations of it.
Figure 1B:
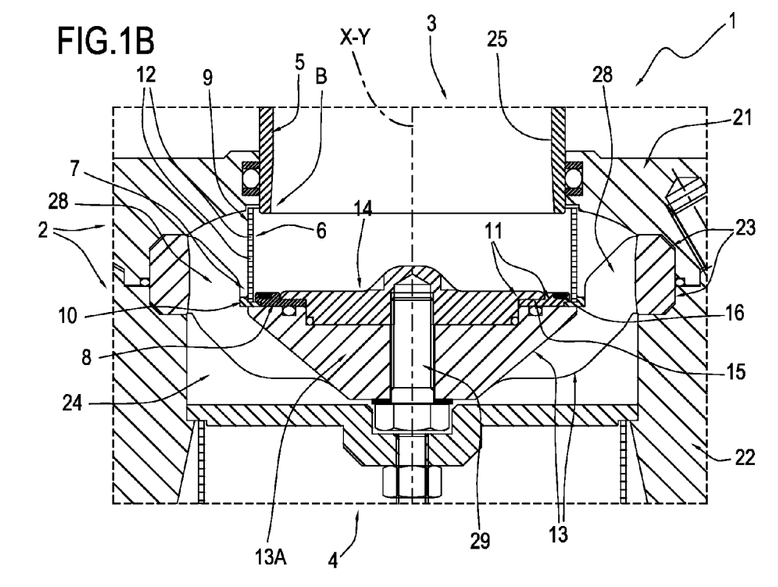

With reference to the accompanying drawings, the numeral 1 in FIGS. 1A and 1B denotes in its entirety a gas pressure regulator made in accordance with this invention.

The gas pressure regulator 1 comprises a central body 2 in which a first, gas inlet pipe 3 and a second, gas outlet pipe 4 are fitted (FIGS. 1A and 1B do not show the part where the pipes are fitted in the central body).

FIGS. 1A and 1B illustrate only part of the central body 2 limited to the relevant central portion.

The central body 2 comprises a first half-part 21 and a second half-part 22 which are connected to each other in sealed manner.

The central body 2 has an internal cavity 24 for connecting the pipes 3 and 4.

The regulator 1 also comprises a shutter 5 which is slidably mounted inside the central body 2.

The shutter 5 comprises a hollow cylindrical body 25 having a respective central axis Y.

The hollow cylindrical body 25 of the shutter is mobile relative to the central body 2 in a direction X coinciding with the central axis Y between a position B, illustrated in FIG. 1B, in which a gas passage section 6 is fully open, and a position A, illustrated in FIG. 1A, in which the gas passage section 6 is closed.

In the non-limiting example illustrated in FIGS. 1A and 1B, the gas flows in the central body 2 substantially in a direction X parallel with the central axis Y of the hollow cylindrical body 25 of the shutter 5; in effect, the gas from the inlet pipe 3 flows through the region inside the hollow cylindrical body 25 of the shutter.

The pressure regulator 1 also comprises a silencing device 7 housed in the cavity 24 in the central body 2 and designed to reduce the noise generated by the operation of the regulator 1.

Figure 5:
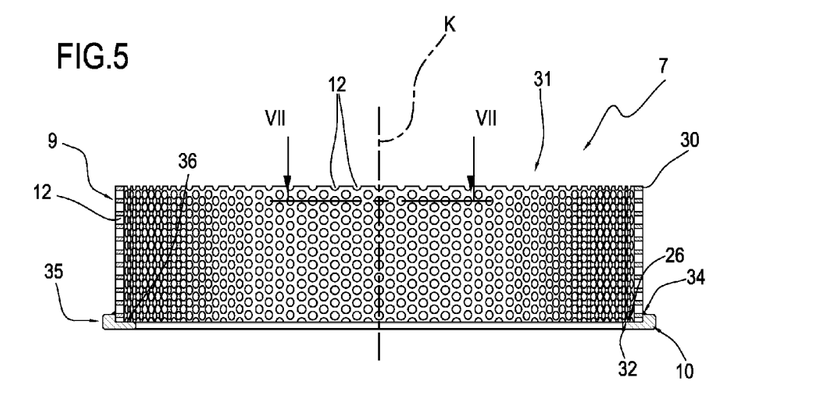
FIG. 5 is a schematic side elevation view, with parts in cross section, of a detail of the pressure regulator of FIGS. 1A and 1B.

As illustrated in FIG. 5, the silencing device 7 comprises a cylindrical metal plate 9, which is perforated to allow the gas to pass through it, and an annular base 10 for supporting and stiffening the cylindrical plate 9.

The cylindrical plate 9 and the annular base 10 are assembled in a single piece.

The cylindrical plate 9 has on its lateral surface 30 a plurality of holes 12 sized to allow the gas to pass through it while at the same time reducing the noise created by the passage of the gas in the regulator 1.

The holes 12 are distributed over the entire lateral surface 30 of the cylindrical plate 9. For simplicity, FIG. 5 shows only some of the holes 12.

The cylindrical plate 9 is a perforated metal plate advantageously made from a strip portion whose end edges are welded together to form an uninterrupted cylindrical lateral surface 30.

The cylindrical plate 9 is thus welded to form an uninterrupted cylindrical lateral surface 30 which guarantees excellent stiffness of the silencing device 7 and uniform noise reduction.

Figure 7:
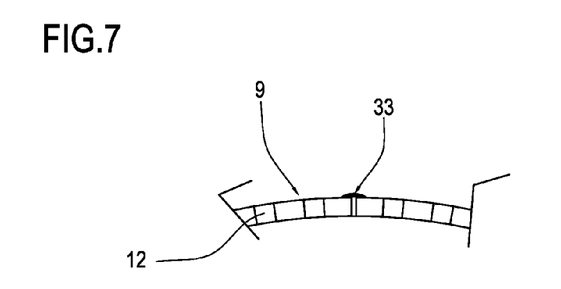
FIG. 7 is a cross section of the detail of FIG. 5 through the section plane VII-VII.

With reference to FIG. 7, the numeral 33 denotes the weld line on the cylindrical plate 9 where the end edges of the of the strip of plate are welded to form the cylindrical plate 9.

Advantageously, the cylindrical plate 9 thus obtained is economical since the steps in the process for its production are quick and easy for an operator to perform, even manually.

As mentioned above, the cylindrical plate 9 and the annular base 10 are assembled in such a way as to form a single piece.

Preferably, the cylindrical plate 9 and the annular base 10 are welded to each other.

The uninterrupted cylindrical plate 9 has considerable radial stiffness and the annular base 10 further stiffens the plate 9.

Advantageously, the silencing device 7 thus obtained can resist high gas speeds.

The cylindrical plate 9 has a central axis K, an upper circumferential edge 31 and a lower circumferential edge 32.

With reference to the non-limiting example of FIG. 5, the annular base 10 has an L-shaped section comprising a short side 35 and a long side 36.

The cylindrical plate 9 is preferably welded to the short side 35 of the L-shaped section in the vicinity of its lower circumferential edge 32.

In FIG. 5, the seam along which the cylindrical plate 9 is welded to the annular base 10 is denoted by the reference numeral 34.

The long side 36 of the L-shaped section of the annular base 10 projects radially towards the central axis K of the cylindrical plate 9.

The pressure regulator 1 comprises a silencing device 7 supporting element 13 located in the cavity 24 and on which the annular base 10 of the silencing device rests in the cavity 24.

The supporting element 13 is in turn fixed to the central body 2 within the cavity 24.

Preferably, the supporting element 13 is removably fixed to the central body 2, for example by one or more screws.

Alternatively, in embodiments which are not illustrated, the supporting element 13 is made as a single piece with the central body 2.

With reference to the example illustrated in FIGS. 1A and 1B, the supporting element 13 of the silencing device 7 comprises a frustoconical body 13A from which a plurality of radial arms 28 extend.

The radial arms 28 are designed to engage in respective seats 23 formed between the half parts 21, 22.

The regulator 1 also comprises an annular element 8 inserted in the cavity 24 of the central body 2 and resting on the supporting element 13.

Figure 8:
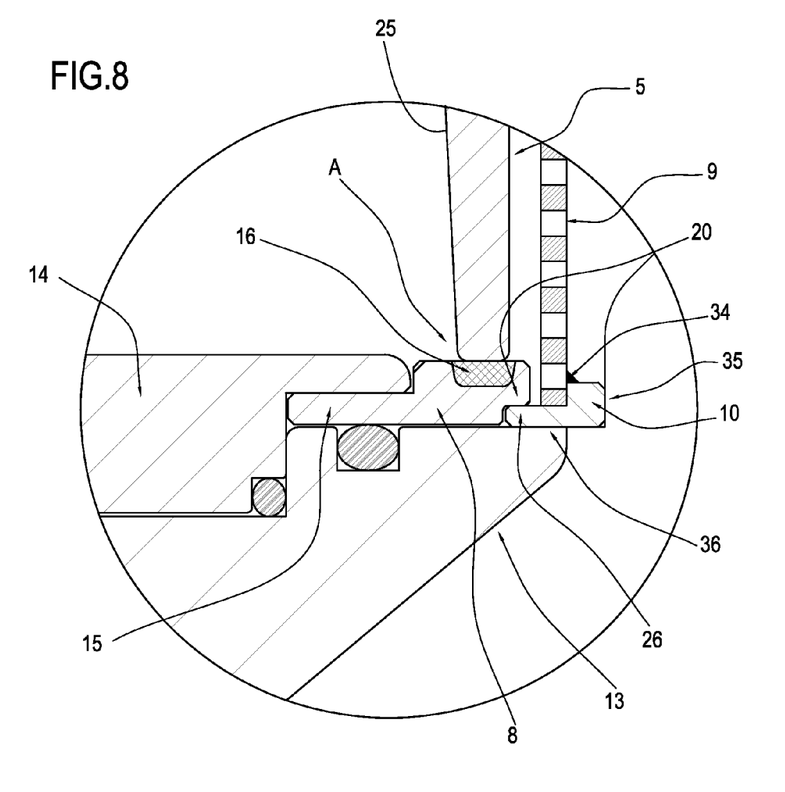
FIG. 8 is an enlarged schematic cross-section of a detail of the pressure regulator from FIG. 1A.

The long side 36 of the L-shaped section of the annular base 10 forms an engagement zone 26, shown more clearly in FIG. 8, designed to make contact with a jutting portion 20 of the annular element 8.

The jutting portion 20 of the annular element 8 is shaped to match the engagement zone 26 of the annular base 10.

In effect, the jutting portion 20 of the annular element 8 is designed to make contact with the engagement zone 26 of the annular base 10 so as to constrain the silencing device 7 in the radial and axial directions relative to the central body 2.

The annular element 8 is also fitted at the top of it with a gasket 16, preferably of rubber or plastic material, designed to engage the shutter 5 in sealed manner when the latter is in the closed position A.

In another embodiment not illustrated in the accompanying drawings, the gasket is fitted at the bottom of the hollow cylindrical body of the shutter and the annular element comprises a contact portion, facing the hollow cylindrical body and with which the shutter gasket comes into contact in sealed manner when the cylindrical body is in the closed position.

The regulator 1 further comprises a disc 14 designed to make contact with an inside portion 15 of the annular element 8.

The disc 14 is connected at the top to the supporting element 13 by a screw 29 and engages the annular element 8 to lock the annular element 8 to the supporting element 13.

The annular element 8 and the disc 14 thus constitute means 11 for fastening the silencing device 7 to the central body 2.

With reference to the embodiment of the regulator 1 of FIGS. 3 and 4, the screw 29 is inserted from above into a respective through hole in the disc 14 and screwed into the supporting element 13, whilst in FIGS. 1A, 1B, 2A and 2B the screw 29 is inserted from below into a respective through hole in the supporting element 13 and screwed into the disc 14.

Figure 9:
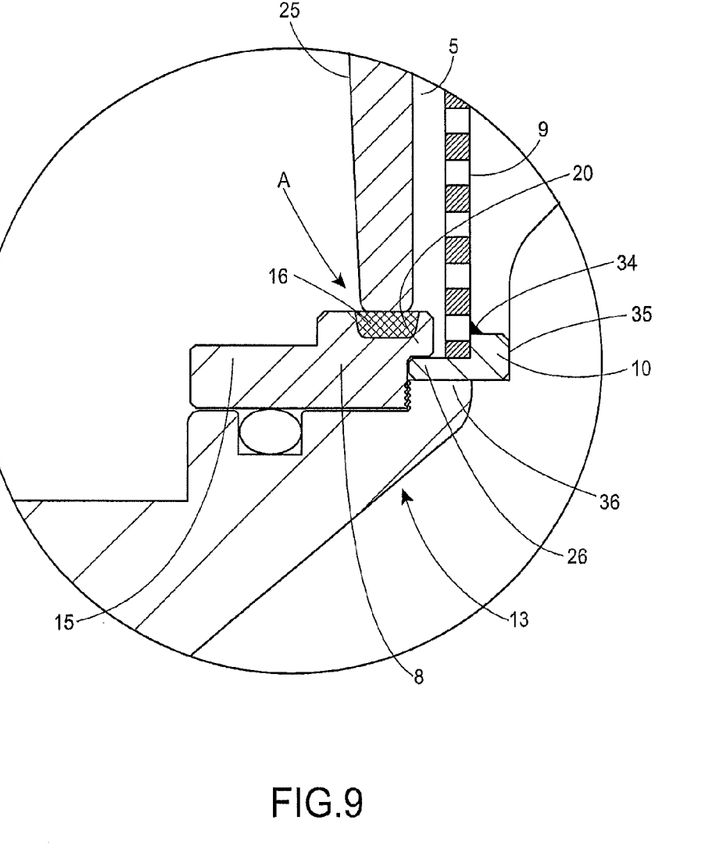
FIG. 9 is an enlarged schematic cross-section of a detail of an alternate embodiment of the pressure regulator of FIG. 1A.

In a further embodiment illustrated in FIG. 9, the regulator 1 does not comprise the disc 14 and the annular element 8 is fixed to the supporting element 13 by gluing or by an interference fit or, alternatively, by a shape fit or by screw means.

Preferably, the annular element 8 comprises an annular threaded portion designed to engage a corresponding annular threaded portion formed on the supporting element 13. In this embodiment, the annular element 8 is screwed to the supporting element 13 in such a way as to provide the removable fastening of the annular element 8 to the supporting element 13.

Figure 2A:
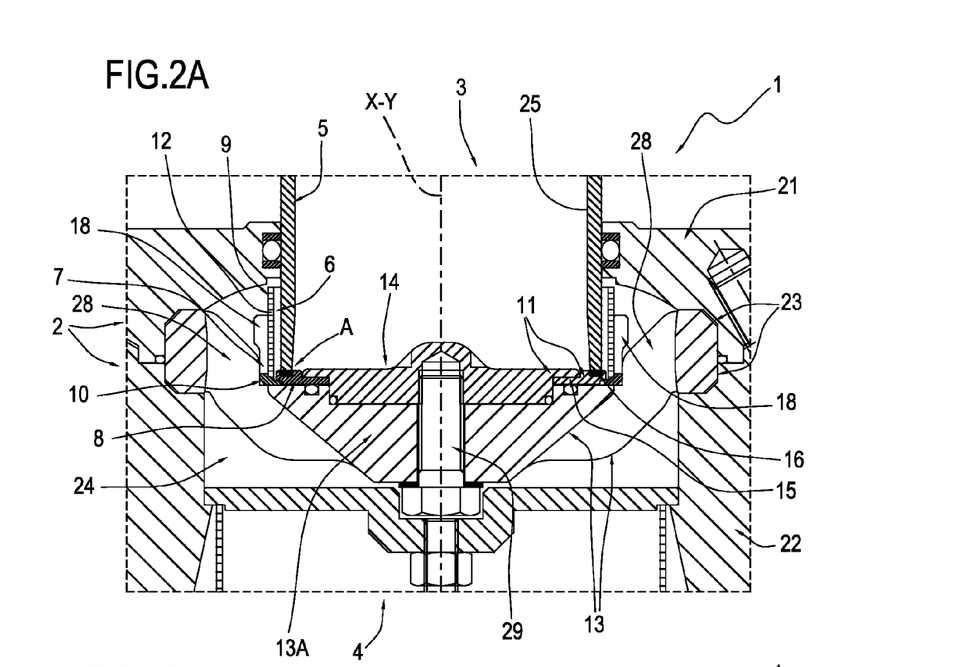
FIGS. 2A and 2B are schematic cross sections illustrating another embodiment of the gas pressure regulator according to the invention in two different configurations of it.
Figure 2B:
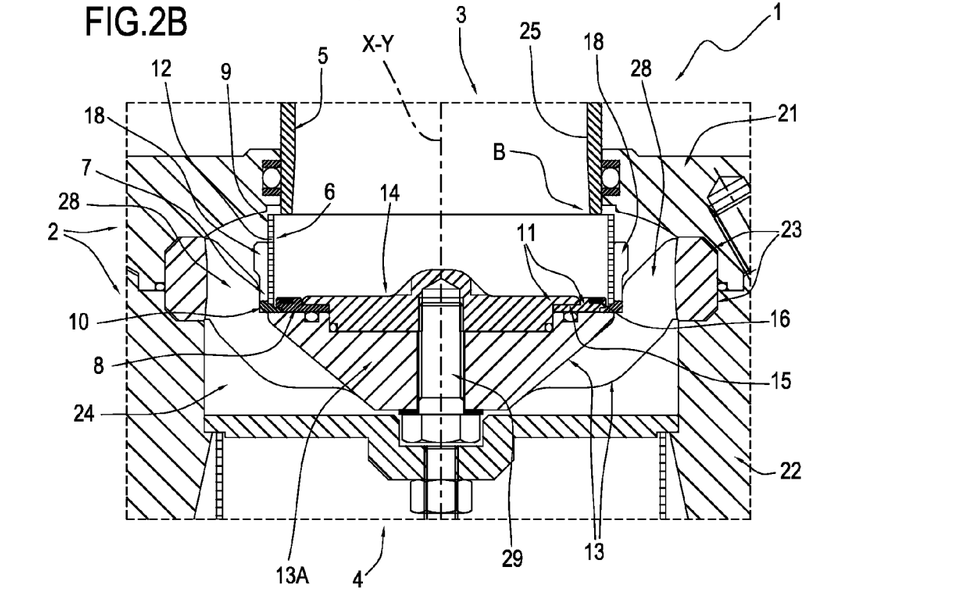
Figure 3:
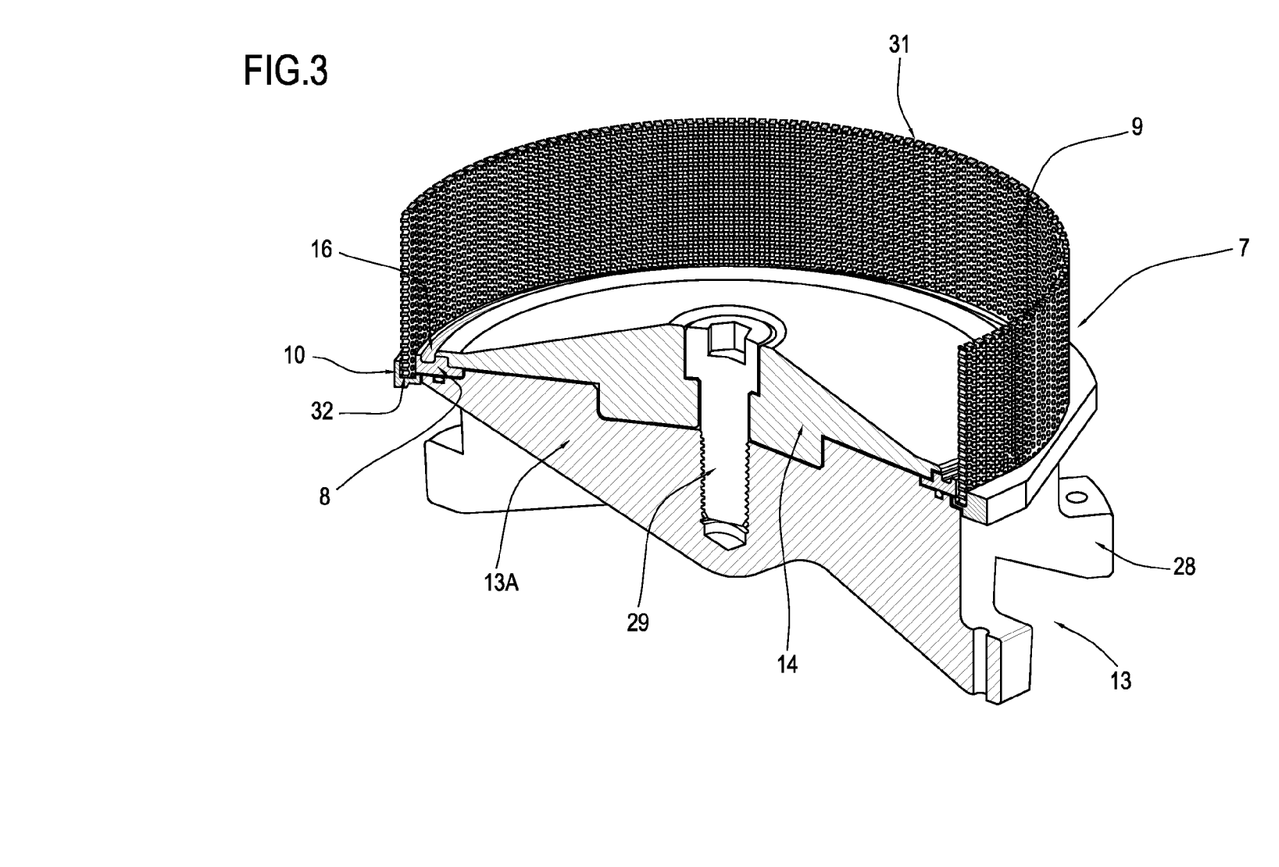
FIGS. 3 and 4 are perspective views, with some parts in cross section, illustrating details of two further embodiments of the pressure regulator according to the invention.
Figure 6:
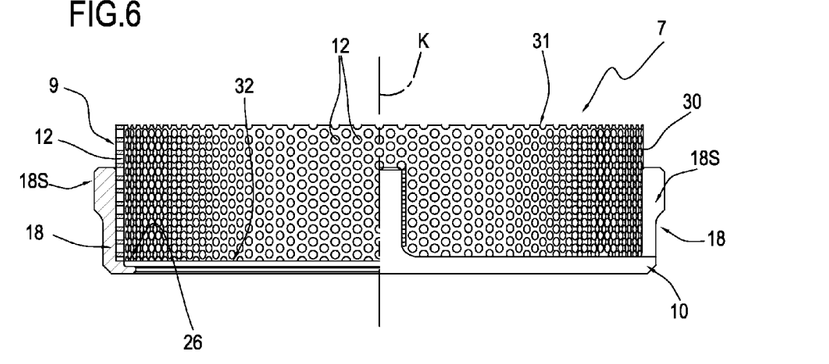
FIG. 6 is a schematic side elevation view, with some parts in cross section, of a detail of the pressure regulator of FIGS. 2A and 2B.

In further embodiments of the pressure regulator, illustrated in FIGS. 2A, 2B and 6, the silencing device 7 comprises a plurality of uprights 18.

The uprights 18 are fixed to the cylindrical plate 9, for example by welding, in order to stiffen the cylindrical plate 9.

Preferably, with reference to the non-limiting example of FIGS. 2A, 2B and 6, these uprights 18 are fixed to the lateral surface 30 of the cylindrical plate 9.

Further, the uprights 18 are fixed to the base 10 preferably by welding.

Alternatively, the uprights 18 can be screwed to the annular base 10 or made as a single piece.

In an embodiment not illustrated, the uprights are fixed only to the cylindrical plate.

In an embodiment also not illustrated, the uprights are fixed to the lateral inside surface of the cylindrical plate.

Figure 4:
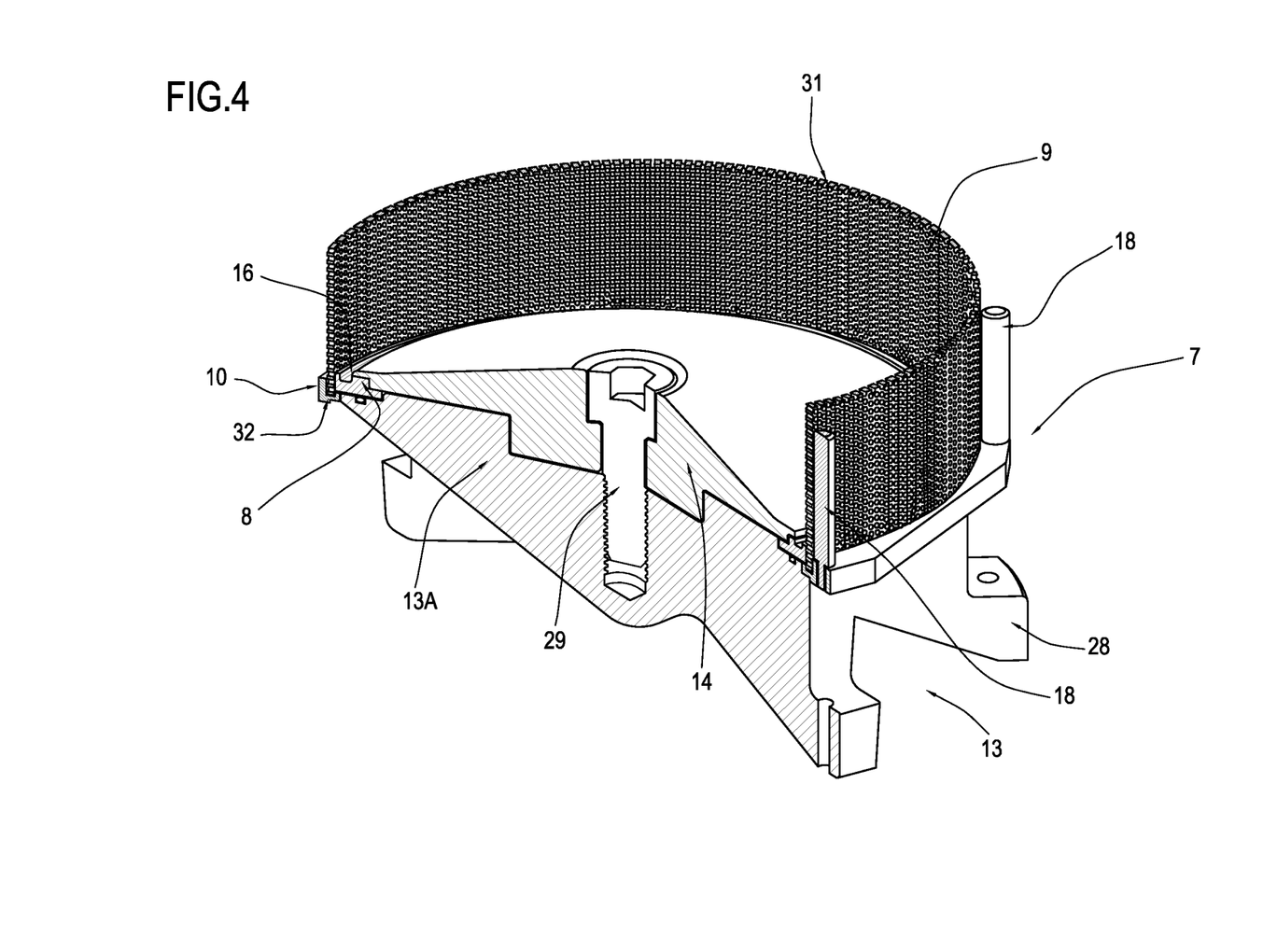

The uprights 18 of the silencing device 7 illustrated in FIG. 4 differ from the uprights of the silencing device 7 illustrated in FIGS. 2A, 2B and 6.

In effect, the uprights 18 of the silencing device 7 of FIG. 4 have a substantially cylindrical shape and extend vertically to the upper circumferential edge 31 of the cylindrical plate 9 whilst the uprights 18 of the silencing device 7 of FIGS. 2A, 2B and 6 have an enlarged upper portion 18S and extend to a predetermined height of the cylindrical plate 9.

The uprights 18 constitute elements 18 for stiffening the cylindrical plate 9 in a substantially radial direction.

Advantageously, the stiffening elements 18 make it possible to strengthen the silencing device 7 in such a way that the regulator 1 can operate at very high differential pressures (generated by high gas speeds).

Moreover, the uprights 18 cover a very limited portion of the lateral surface 30 of the cylindrical plate 9 and thus, advantageously, do not significantly reduce the area of gas passage through the holes 12 in the cylindrical plate 9.

Further, the uprights 18 are preferably positioned at equal angular intervals so as to stiffen the cylindrical plate 9 uniformly.

The description set out above thus defines a gas pressure regulator 1 equipped with a silencing device 7 which can operate reliably with gas flowing at high speeds and with gas carrying dirt and/or debris and which is also inexpensive to make.

The silencing device 7 is also light and compact at the same time.

The regulator 1 proposed herein therefore advantageously has a reduced weight and limited size.

The description set out above also defines a method for improving the performance of a gas pressure regulator of known type equipped with a silencing device hereinafter referred to as existing silencing device.

The method comprises the steps of:
removing the existing silencing device;
providing a silencing device 7 made according to this invention, comprising a cylindrical metal plate 9, which is perforated to allow the gas to pass through it, and an annular base 10 for supporting and stiffening the cylindrical plate 9 and having a zone 26 for engaging means 11 for fastening the silencing device 7 to the central body 2, and where the cylindrical plate 9 and the annular base 10 are assembled in a single piece;
fastening the silencing device 7 to the inside of the central body 2 using fastening means 11.

Preferably, the step of fastening the silencing device 7 to the inside of the central body 2 comprises the following steps:
providing fastening means 11 comprising an annular element 8 having a jutting portion 20 shaped to match the engagement zone 26 of the annular base 10;
inserting the silencing device 7 into the central body 2;
inserting the annular element 8 into the central body 2 in such a way that it engages the engagement zone 26 of the annular base 10;
fastening the annular element 8 to the central body 2.

Advantageously, the proposed method allows the performance of known pressure regulators to be improved at considerably reduced costs.

More specifically, the proposed method offers a simple and low-cost solution to improve the reliability of a regulator.

In effect, all of the above mentioned steps can be performed without having to modify the housing of the silencing device in the central body of the regulator.

Improved performance can be achieved by simply substituting the existing silencing device with a silencing device capable of operating reliably even with gas flowing at high speed and sized to suit the actual dimensions of the housing.

That means existing pressure regulators can be upgraded at a limited cost and with the minimum of intervention, in particular where the regulators need to operate under critical conditions (high gas speed, dust and/or dirt carried by the gas flow) and are therefore subject to frequent faults and/or rapid wear.

The invention described is susceptible of industrial application and may be modified and adapted in several ways without thereby departing from the scope of the inventive concept. Moreover, all details of the invention may be substituted by technically equivalent elements.

The invention claimed is:

1. A gas pressure regulator comprising:
a central body having a first, gas inlet pipe and a second, gas outlet pipe;
a shutter housed at least partially in the central body and mobile to adjust the opening of a section for the passage of the gas between a position (B) in which the section is fully open and a position (A) in which the section is closed;
a silencing device located in the central body at the passage section, for reducing the noise created by the passage of the gas;
means for fastening the silencing device to the central body,
the regulator being characterized in that the silencing device comprises
a cylindrical perforated plate to allow the passage of the gas set atop an annular base for supporting and stiffening the cylindrical plate, the annular base having an engagement zone extending radially toward an axis of the cylindrical perforated plate for engaging the means for fastening the silencing device to the central body,
the cylindrical plate and the annular base being assembled in a single piece.

2. The pressure regulator according to claim 1, wherein the fastening means comprise an annular element having a jutting portion, said jutting portion being shaped to match the engagement zone of the annular base in order to engage the engagement zone and constrain the silencing device to the central body.

3. The pressure regulator according to claim 2, wherein the annular element supports a gasket with which the shutter is engaged in a sealed fashion in the closed position (A).

4. The pressure regulator according to claim 2, wherein the shutter supports a gasket and the annular element comprises a contact portion with which the gasket of the shutter engages in a sealed fashion when the latter is in the closed position (A).

5. The pressure regulator according to claim 2, comprising a silencing device supporting element located in the central body and designed to support the silencing device and the annular element, and in that the annular element comprises a threaded portion designed to engage the supporting element in order to fasten the annular element to the supporting element.

6. The pressure regulator according to claim 2, comprising a silencing device supporting element located in the central body and designed to support the silencing device and the annular element, said fastening means further comprising a disc attachable to the supporting element and designed to engage at least one portion of the annular element.

7. The pressure regulator according to claim 6, wherein the disc is fastened by screw means to the supporting element in order to lock the annular element to the supporting element.

8. The pressure regulator according to claim 1, wherein the cylindrical plate is welded to the base to form said single piece.

9. The pressure regulator according to claim 1, wherein the cylindrical plate extends circularly without breaks.

10. The pressure regulator according to claim 1, comprising elements for stiffening the cylindrical plate.

11. The pressure regulator according to claim 10, wherein the stiffening elements are connected to the annular base.

12. The pressure regulator according to claim 10, wherein the stiffening elements extend outside the cylindrical plate in a direction substantially parallel to the axis of the cylindrical plate.

13. A method for improving the performance of a gas pressure regulator comprising
- a central body having a first, gas inlet pipe and a second, gas outlet pipe;
- a shutter housed at least partially in the central body,
- an existing silencing device located in the central body in order to reduce the noise created by the passage of the gas;

the method being characterized by the steps of:
removing the existing silencing device;
providing a silencing device to replace the existing silencing device, comprising: a cylindrical perforated plate to allow the passage of the gas set atop an annular base for supporting and stiffening the cylindrical plate, the annular base having an engagement zone extending radially toward an axis of the cylindrical perforated plate for engaging a means for fastening the silencing device to the central body, said cylindrical plate and annular base being assembled in a single piece,
fastening the silencing device to the inside of the central body using the means for fastening.

14. The method according to claim 13, wherein the step of fastening the silencing device to the inside of the central body comprises the following steps:
providing means for fastening including an annular element having a jutting portion shaped to match the engagement zone of the annular base;
inserting the silencing device into the central body;
inserting the annular element into the central body in such a way that it engages the engagement zone of the annular base;
fastening the annular element to the central body.

15. A gas pressure regulator comprising:
a central body having a first, gas inlet pipe and a second, gas outlet pipe;
a shutter housed at least partially in the central body and mobile to adjust the opening of a section for the passage of the gas between a position (B) in which the section is fully open and a position (A) in which the section is closed;
a silencing device located in the central body at the passage section, for reducing the noise created by the passage of the gas;
means for fastening the silencing device to the central body, the means for fastening including an annular element having a jutting portion shaped to constrain the silencing device to the central body,
the regulator being characterized in that the silencing device comprises
a cylindrical perforated plate to allow the passage of the gas,
an annular base for supporting and stiffening the cylindrical plate and having an engagement zone shaped to match and engage the jutting portion of the annular element for fastening the silencing device to the central body,
the cylindrical plate and the annular base being assembled in a single piece; and
a silencing device supporting element located in the central body and designed to support the silencing device and the annular element, and in that the annular element comprises a threaded portion designed to engage the supporting element in order to fasten the annular element to the supporting element.

16. A gas pressure regulator comprising:
a central body having a first, gas inlet pipe and a second, gas outlet pipe;
a shutter housed at least partially in the central body and mobile to adjust the opening of a section for the passage of the gas between a position (B) in which the section is fully open and a position (A) in which the section is closed;
a silencing device located in the central body at the passage section, for reducing the noise created by the passage of the gas;
means for fastening the silencing device to the central body, the means for fastening including an annular element having a jutting portion shaped to constrain the silencing device to the central body,
the regulator being characterized in that the silencing device comprises
a cylindrical perforated plate to allow the passage of the gas,
an annular base for supporting and stiffening the cylindrical plate and having an engagement zone shaped to match and engage the jutting portion of the annular element for fastening the silencing device to the central body,
the cylindrical plate and the annular base being assembled in a single piece; and
a silencing device supporting element located in the central body and designed to support the silencing device and the annular element, said fastening means further comprising a disc attachable to the supporting element and designed to engage at least one portion of the annular element.

17. The pressure regulator according to claim 16, wherein the disc is fastened by screw means to the supporting element in order to lock the annular element to the supporting element.

* * * * *